US012583541B2

(12) United States Patent
Lee et al.

(10) Patent No.: US 12,583,541 B2
(45) Date of Patent: Mar. 24, 2026

(54) FIXING DEVICE FOR VEHICLE

(71) Applicants: Hyundai Motor Company, Seoul
(KR); Kia Corporation, Seoul (KR)

(72) Inventors: Jae Seung Lee, Hwaseong-Si (KR);
Won Ki Song, Seongnam-Si (KR); **Jin
Ho Hwang, Cheonan-Si (KR); Joong
Hyun Shin, Hwaseong-Si (KR); Hyung
Sik Choi**, Seoul (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 386 days.

(21) Appl. No.: 18/387,417

(22) Filed: Nov. 6, 2023

(65) Prior Publication Data

US 2025/0019020 A1      Jan. 16, 2025

(30) Foreign Application Priority Data

Jul. 10, 2023    (KR) ........................ 10-2023-0089319

(51) Int. Cl.
B62D 27/06        (2006.01)
B62D 21/09        (2006.01)
(Continued)

(52) U.S. Cl.
CPC ........... B62D 63/025 (2013.01); B62D 21/09
(2013.01); B62D 33/077 (2013.01); *B62D
24/00* (2013.01); *B62D 24/02* (2013.01)

(58) Field of Classification Search
CPC ........ B62D 21/09; B62D 24/00; B62D 24/02;
B62D 27/06; B62D 33/077; B62D
63/025;
(Continued)

(56) References Cited

U.S. PATENT DOCUMENTS

| 10,029,603 | B2 * | 7/2018 | Stocks | ................. | B62D 63/025 |
| 10,479,427 | B2 * | 11/2019 | Scaringe | ................. | B60K 1/04 |

(Continued)

FOREIGN PATENT DOCUMENTS

KR      10-2018-0070787          6/2018

OTHER PUBLICATIONS

CN111942483A with English translation; Chen; Nov. 17, 2020
(Year: 2025).*

(Continued)

*Primary Examiner* — Roger L Pang

(74) *Attorney, Agent, or Firm* — MORGAN, LEWIS &
BOCKIUS LLP

(57)          ABSTRACT

A fixing device for a vehicle configured to connect the
vehicle's cabin unit and loading unit of loading cargo at the
rear of the cabin unit includes a coil transmitting an elec-
tromagnetic force to a drive pulley, an assembly module
including a drive pulley and mechanically fixing the cabin
unit and the loading unit together through a driving force of
the drive pulley via the coil when the loading unit moves and
aligns with the cabin unit, and a magnetic module enclosing
the assembly module on an external side of the assembly
module and magnetically fixing the cabin unit and the
loading unit together by changing a magnetic circuit through
a rotation force of a magnetic body while the cabin unit and
the loading unit are mechanically connected to each other.

14 Claims, 5 Drawing Sheets

(51) Int. Cl.
    *B62D 33/077*     (2006.01)
    *B62D 63/02*     (2006.01)
    *B62D 24/00*     (2006.01)
    *B62D 24/02*     (2006.01)

(58) Field of Classification Search
    CPC .......... B60Y 2200/14; B60Y 2200/147; B60Y
    2200/148
    USPC ................................... 296/182.1, 35.1, 35.3
    See application file for complete search history.

(56) References Cited

U.S. PATENT DOCUMENTS

2022/0134987 A1*   5/2022   Tse ...................... B60R 21/0134
    180/271
2022/0306220 A1*   9/2022   Moarefi ................. B62D 24/00

OTHER PUBLICATIONS

KR20220044007A with English translation; Park; Apr. 6, 2022
(Year: 2025).*

* cited by examiner

FIXING DEVICE FOR VEHICLE

CROSS REFERENCE TO RELATED APPLICATION

The present application claims priority to Korean Patent Application No. 10-2023-0089319, filed Jul. 10, 2023, the entire contents of which is incorporated herein for all purposes by this reference.

BACKGROUND OF THE PRESENT DISCLOSURE

Field of the Present Disclosure

The present disclosure relates to a fixing device for a vehicle, and more particularly, to a fixing device for a vehicle provided with a cabin unit and a loading unit to be fixed thereto and configured to enhance the coupling force between the cabin unit and the loading unit by mechanical and magnetic connection.

Description of Related Art

With the increasing concern for the environment, the number of electrified vehicles provided with electric motors as a power source is increasing recently.

Electrified vehicles take advantage of their characteristic flat floors to create spacious interiors, similar to a living room. For example, numerous concepts for bed seats for rest and sleep during traveling have been provided for autonomous driving vehicles, purpose-built vehicles (PBVs), and vehicles with three-row seating. The demand for camping or traveling while sleeping in a vehicle is on the rise due to the growing individualized leisure activities.

FIG. 1 is a view exemplarily illustrating a cabin unit and a loading unit at the rear of the cabin unit.

FIG. 1 shows that the coupling of the vehicle's cabin unit 10 and loading unit 20 provides additional internal space. At the instant time, a secure attachment between the cabin unit and the loading unit is crucial to passenger safety.

Conventionally, two methods are commonly used to couple the vehicle's cabin unit and loading unit: mechanical fixing and magnetic fixing. However, problems are that mechanical fixing requires additional man-hours for assembly and disassembly of the cabin unit and the loading unit and that frequent assembly and disassembly reduce durability. A further problem is that the fixing force between the cabin unit and loading unit by the magnetic fixing is not strong compared to the mechanical fixing.

Thus, there is a demand for a solution that increases coupling force by fixing the loading unit to the cabin unit together mechanically and magnetically.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fixing device for a vehicle configured to enhance coupling force between the vehicle's cabin unit and loading unit by mechanical and magnetic connection.

The technical object that the present disclosure intends to realize is not limited to the technical object described above, and other technical objects not mentioned will be clearly understood by those skilled in the art to which an exemplary embodiment of the present disclosure pertains from the following description.

The present disclosure for resolving the issues described above relates to a fixing device for a vehicle employed to connect a vehicle's cabin unit and loading unit used to load cargo at the rear of the cabin unit. According to an exemplary embodiment of the present disclosure, the fixing device for a vehicle includes a coil transmitting an electromagnetic force to a drive pulley, an assembly module including a drive pulley and mechanically fixing the cabin unit and the loading unit together through a driving force of the drive pulley via the coil when the loading unit moves and aligns with the cabin unit, and a magnetic module enclosing the assembly module on an external side of the assembly module and magnetically fixing the cabin unit and the loading unit together by changing a magnetic circuit through a rotation force of a magnetic body while the cabin unit and the loading unit are mechanically connected to each other.

For example, the drive pulley may include a first pulley connected to the magnetic body to receive the rotation force directly and a second pulley connected to the first pulley through a pulley belt to receive a driving force from the first pulley.

For example, the magnetic body of the magnetic module is mechanically connected to the first pulley and rotates through the driving force of the first pulley, and the cabin unit and the loading unit are magnetically fixed together through the rotation force generated during the rotation of the magnetic body.

For example, the assembly module may include a locking portion that rotates through the driving force received from the second pulley and a coupling portion selectively coupled to the locking portion. The locking portion may be provided in the cabin unit, and the coupling portion may be provided in the loading unit.

For example, a coupling groove recessed upward may be formed on a lower surface of the coupling portion, and the locking portion may slide into the coupling groove as the loading unit moves downward and rotates through the driving force of the second pulley to be coupled to the coupling portion once the locking portion settles at the top portion of the coupling groove after sliding thereinto.

For example, the locking portion may be formed in a semicircular shape with a protrusion on one side thereof.

For example, the coupling groove may be formed in a recessed shape along the sliding path of the locking portion and the top portion of the coupling groove may be formed in a semicircle shape so that the locking portion may settle thereat, rotate, and be coupled to the coupling portion.

For example, a controller configured for controlling the coil, the assembly module, and the magnetic module to connect or disconnect the cabin unit and the loading unit may be further included.

For example, when connecting the cabin unit and the loading unit together, the controller may magnetically fix the cabin unit and the loading unit together by changing a magnetic circuit through the rotation force of the magnetic body while the cabin unit and the loading unit are mechanically fixed together.

For example, when disconnecting the cabin unit and the loading unit, the controller may mechanically unfix the cabin unit and the loading unit while the cabin unit and the loading unit are magnetically unfixed by changing the magnetic circuit through the rotation force of the magnetic body.

For example, the controller may disconnect the cabin unit and loading unit by controlling the coil to generate the electromagnetic force in a direction opposite to the direction in which the electromagnetic force of the coil is generated when the cabin unit and the loading unit are connected.

According to an exemplary embodiment of the present disclosure, the fixing device for a vehicle enhances the coupling force between the cabin unit and the loading unit by mechanical and magnetic connection.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
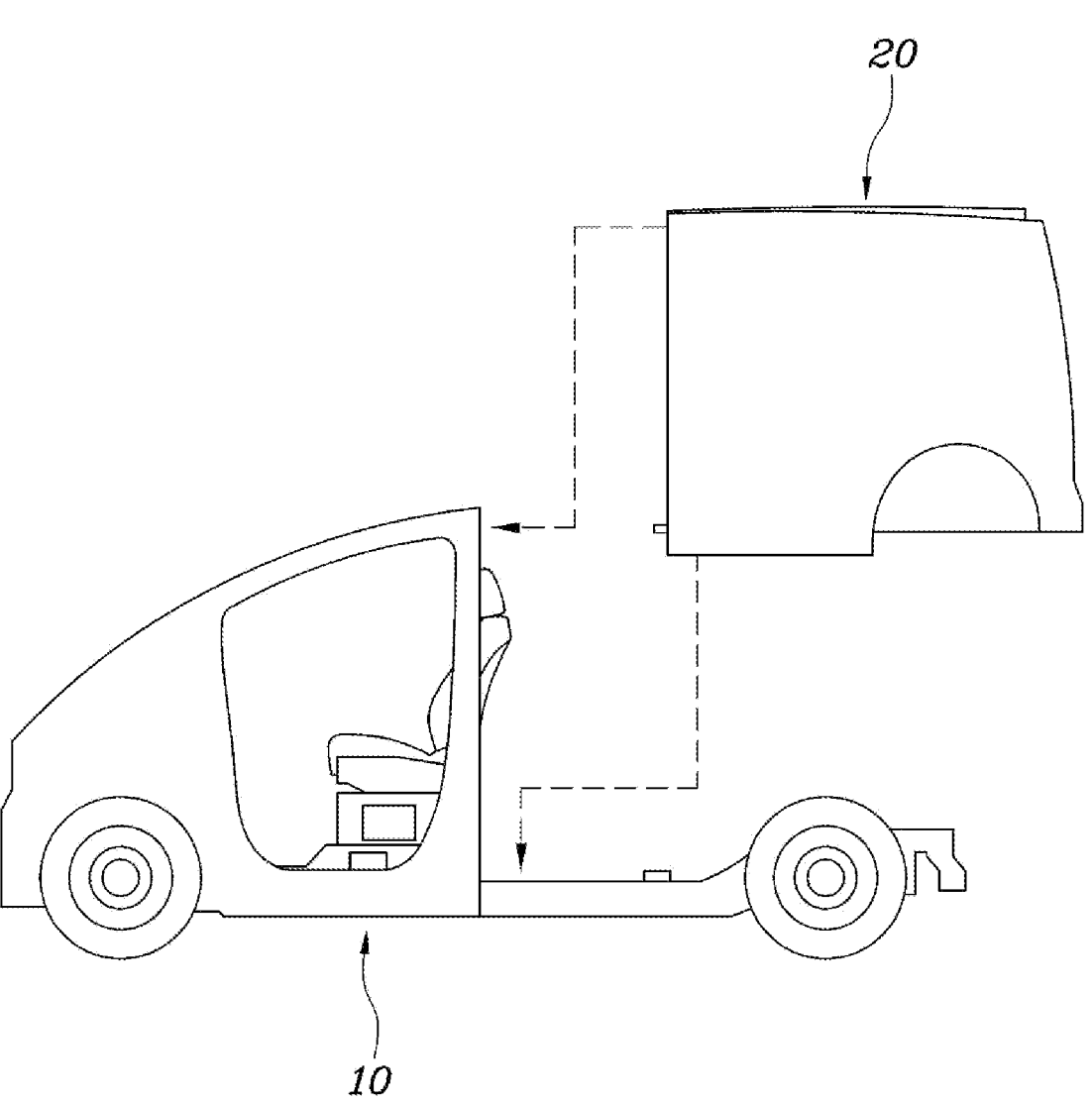
FIG. 1 is a view exemplarily illustrating a vehicle's cabin unit and loading unit of loading cargo at the rear of the cabin unit.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present disclosure will be described in detail with reference to the accompanying drawings, but the same reference numerals will be assigned to the similar or same components regardless of drawing numbers and repetitive descriptions will be omitted.

The suffixes "module" and "unit" for the components used in the following description are provided or interchangeably used only to facilitate the writing of the specification, without necessarily indicating a distinct meaning or role of their own.

When it is determined that the specific description of the related and already known technology may obscure the essence of the exemplary embodiments included herein, the specific description will be omitted. Furthermore, it is to be understood that the accompanying drawings are only intended to facilitate understanding of the exemplary embodiments included herein and are not intended to limit the technical ideas included herein are not limited to the accompanying drawings and include all the modifications, equivalents, or substitutions within the spirit and technical scope of the present disclosure. The terms including ordinal numbers such as first, second, and the like may be used to describe various components, but the components are not to be limited by the terms. The terms may only be used for distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

Furthermore, a unit or a control unit included in the names such as a motor control unit (MCU), a hybrid control unit (HCU), and the like is a term widely used in the naming of controllers that control specific functions of a vehicle and does not mean a generic function unit.

A controller may include a communication device that communicates with other controllers or sensors to control the functions for which the controller is responsible, a memory that stores an operating system or logic instructions and input and output information, and one or more processors that perform determinations, calculations, decisions, and the like necessary for controlling the functions for which the controller is responsible.

According to various exemplary embodiments of the present disclosure, it is provided to further enhance the coupling force between a vehicle's cabin unit and loading unit by mechanical and magnetic connection through a fixing device for a vehicle.

Figure 2:
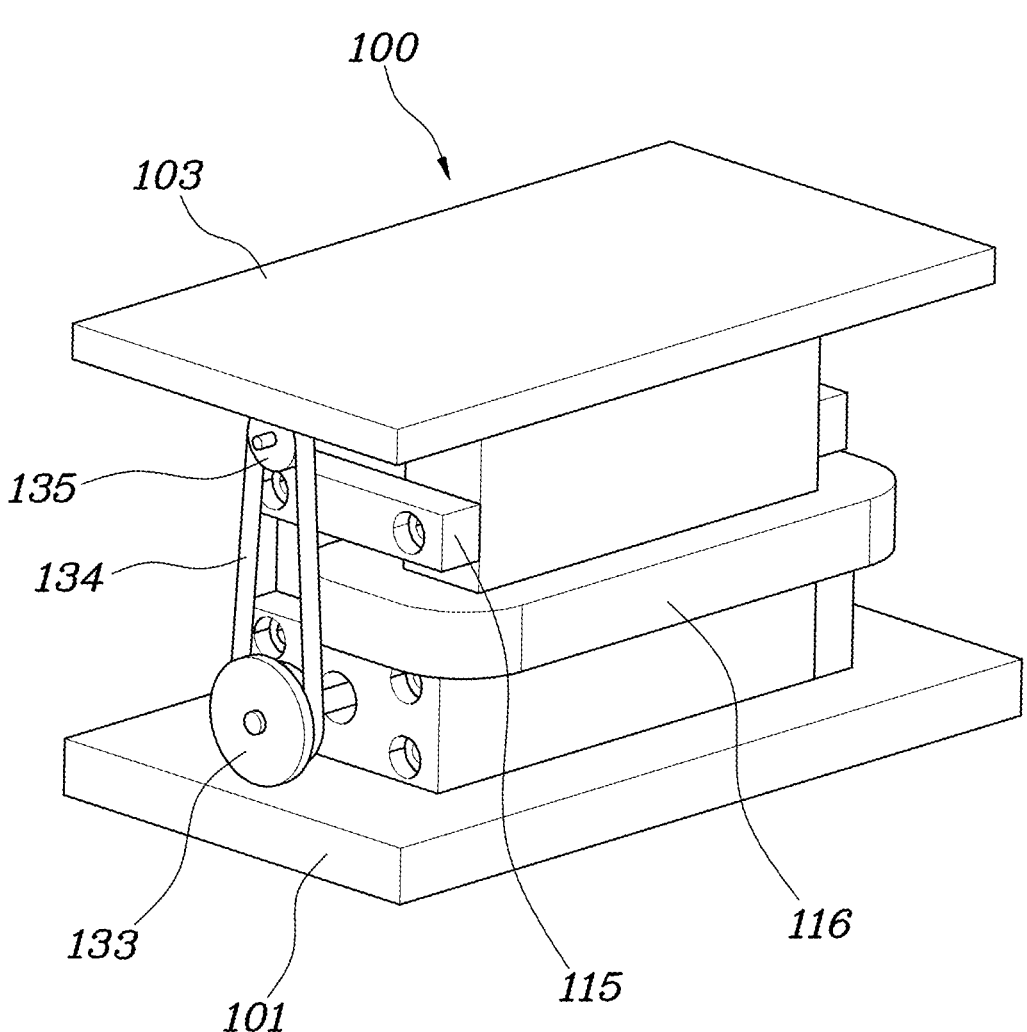
FIG. 2 is a view exemplarily illustrating a fixing device for a vehicle according to various exemplary embodiments of the present disclosure.

FIG. 2 is a view exemplarily illustrating a fixing device for a vehicle according to various exemplary embodiments of the present disclosure. FIG. 2 mainly shows components related to the exemplary embodiment of the present disclosure. It is to be understood that the actual implementation of the fixing device for a vehicle may include fewer or more components.

FIG. 2 shows that the fixing device for a vehicle according to various exemplary embodiments of the present disclosure may include a coil 116, an assembly module 200, and a magnetic module 300. The fixing device for the vehicle 100 according to an exemplary embodiment of the present disclosure may be provided between upper and lower covers 101, 103, and the cabin unit 10 and the loading unit 20 may be fixed together by mechanical and magnetic connection between the right and left connecting modules 111, 113.

When the loading unit 20 is coupled to the cabin unit 10, the coil 116 may receive power and directly transmits an electromagnetic force to the drive pulley. Employing the coil 116 in the fixing by the fixing device 100 for the vehicle can cut down power consumption and reduce the generation of electromagnetic waves. Furthermore, a plurality of drive pulleys are provided and each includes the first pulley 133 and the second pulley 135. The first pulley 133 may directly receive the electromagnetic force of the coil 116, and the second pulley 135 may be connected to the first pulley 133 through a pulley belt 134 and receive the driving force from the first pulley 133. At the instant time, a magnetic body 117 of a magnetic module to be described below is mechanically connected to the first pulley 133 so that a magnetic force is generated by the rotation of the magnetic body 117. This will be described below.

Furthermore, the assembly module may mechanically fix the cabin unit 10 and the loading unit 20 together. The assembly module may include a locking portion 123 and a coupling portion 120. The locking portion 123 is mounted in the cabin unit 10 and rotates through the driving force received from the second pulley 135 to which the locking portion 123 is connected. The coupling portion 120 is provided in the loading unit 20 and is selectively coupled to the locking portion 123 to provide a mechanical fixing force and thus increase the axial force of the fixing device 100. Detailed description with reference to FIG. 3, FIG. 4, and FIG. 5 will follow.

Figure 3:
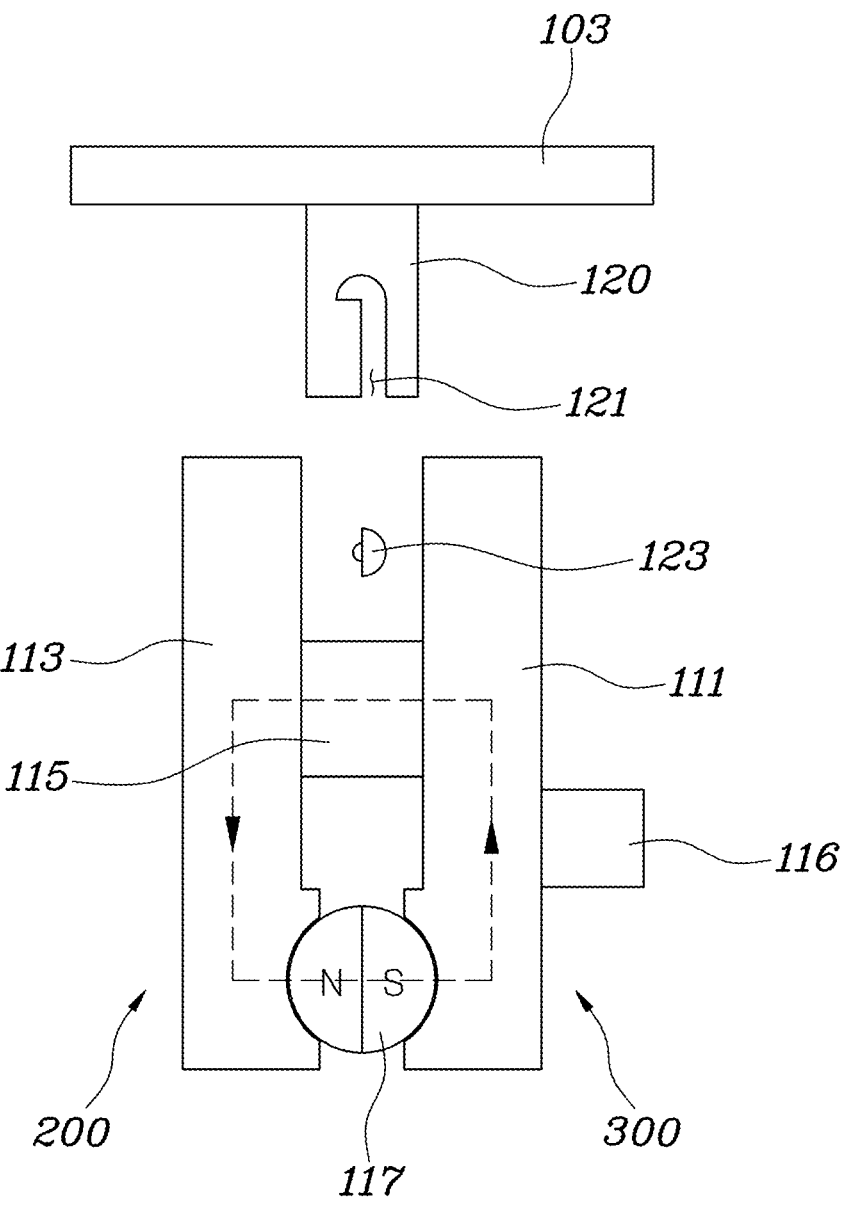
FIG. 3, FIG. 4, and FIG. 5 are views exemplarily illustrating a locking portion and a coupling portion coupled to each other according to various exemplary embodiments of the present disclosure.
Figure 4:
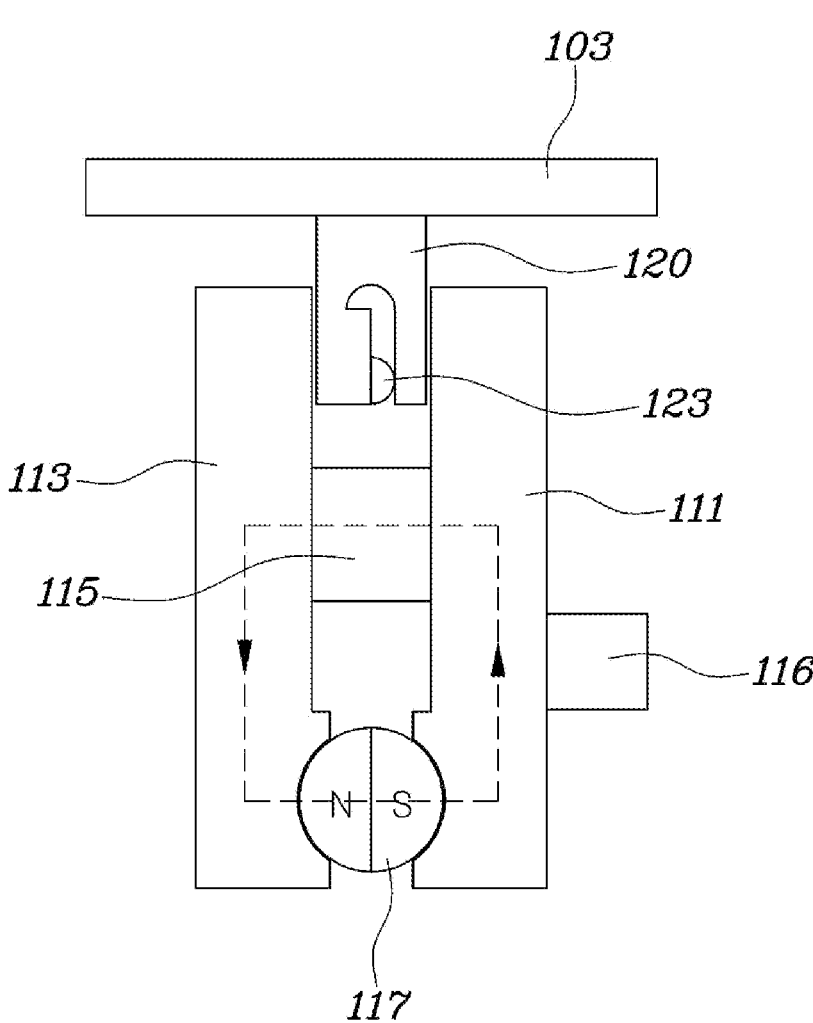
Figure 5:
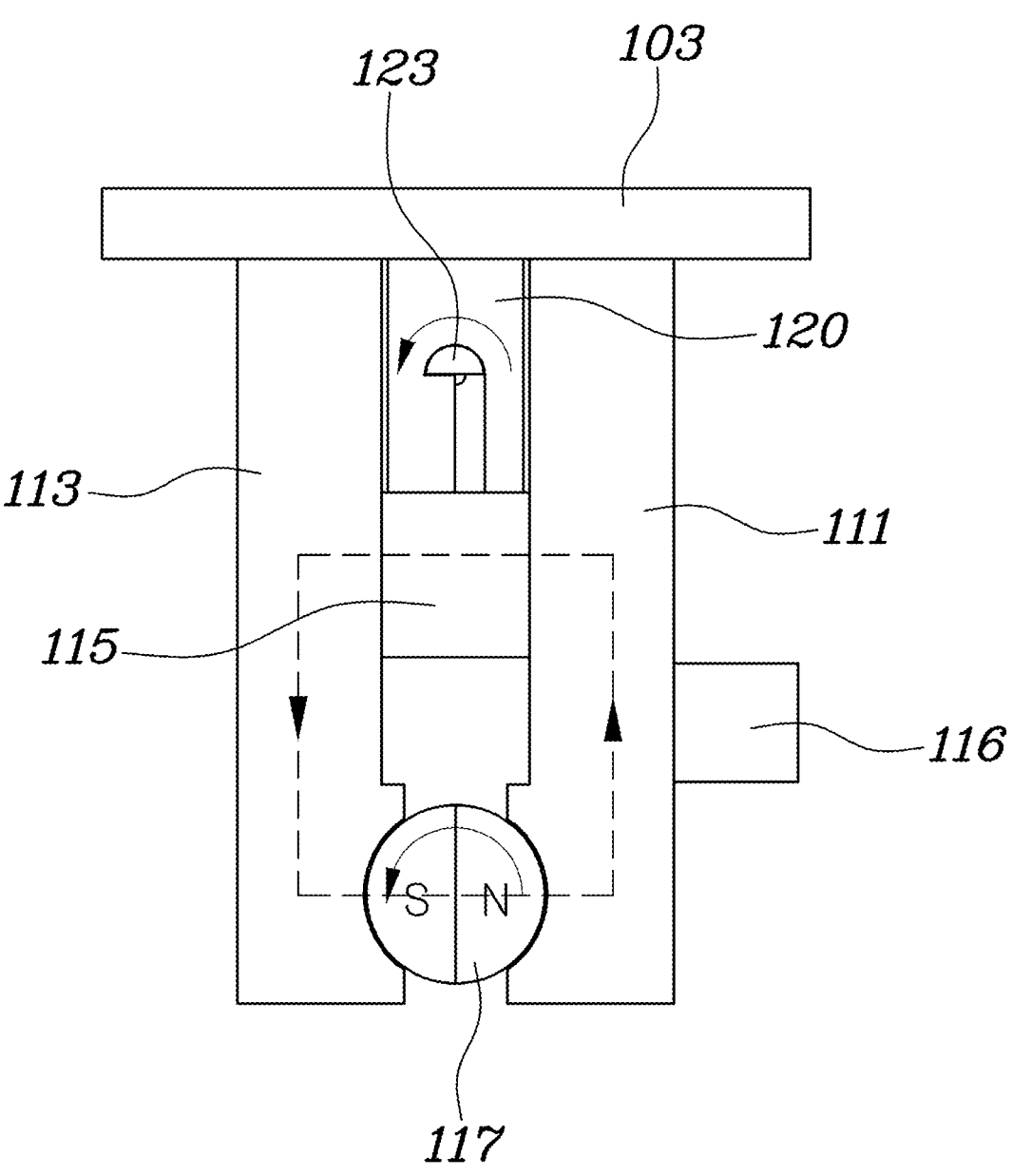

FIG. 3, FIG. 4, and FIG. 5 are views exemplarily illustrating the locking portion 123 and the coupling portion 120 coupled to each other.

FIG. 3, FIG. 4, and FIG. 5 show that the coupling groove recessed upward is formed on the lower surface of the coupling portion 120. The present configuration is directed to ensure that the locking portion 123 is coupled to the coupling portion 120 as the loading unit 20 moves downward when the loading unit 20 moves and aligns with the cabin unit 10. The locking portion 123 slides into the coupling groove 121 as the loading unit 20 moves downward. At the instant time, once the locking portion 123 settles at the top portion of the coupling groove 121 after sliding thereinto, the locking portion 123 rotates through the driving force of the second pulley 135 and is coupled to the coupling portion 120.

To the present end, the structure is to be designed so that the vehicle's cabin unit 10 and the loading unit 20 may be connected through the locking portion 123 and the coupling groove 121. First, the structure is to be designed so that the locking portion 123 may be coupled to the coupling portion 120 while rotating. For example, the locking portion 123 is formed in a semicircular shape with a protrusion rotatable on one side of the locking portion 123. Rotation of the semicircular locking portion 123 at the top portion of the coupling groove 121 may connect the vehicle's cabin unit 10 and the loading unit 20.

Next, the coupling groove 121 may be formed in a recessed shape along the sliding path of the locking portion 123 and the top portion of the coupling groove 121 may be formed in the same semicircular shape as the locking portion 123 so that the locking portion 123 may settle thereat, rotate, and be coupled to the coupling portion 120.

Furthermore, the magnetic module may enclose the assembly module on the external side of the assembly module and magnetically fix the cabin unit 10 and the loading unit 20 together. A magnetic force is generated in the magnetic module by changing a magnetic circuit through the rotation force of the magnetic body 117 while the cabin unit 10 and the loading unity 20 are mechanically connected to each other.

In the instant case, the magnetic body 117 of the magnetic module rotates through the driving force of the first pulley 133 through the electromagnetic force of the coil 116. The cabin unit 10 and the loading unit 20 are magnetically fixed together along with a linear magnetic magnet 115 through the rotation force generated during the rotation of the magnetic body 117. FIG. 5 shows that when the locking portion 123 and the coupling portion 120 are coupled to each other, the cabin unit 10 and the loading unit 20 are mechanically and magnetically fixed together and a magnetic circuit is also formed in the upper portion.

In other words, the magnetic body 117 rotates when the electric power is supplied to the coil 116 and thus the first pulley 133 connected to the magnetic body 117 rotates, The magnetic circuits are formed between the magnetic body 117 and the liner magnet 115 and between the magnetic body 117 and the lower cover 103, generating a magnetic force the magnetic body 117 and the lower cover 103. When the power supply to the coil 116 is interrupted, the magnetic circuit is formed only the magnetic body 117 and the liner magnet 115, the magnetic body 117 does not rotate and thus the first pulley 133 and the second pulley 135 do not rotate, thereby maintaining the coupling state between the lower cover 20 and the assembly module.

So as to decouple the cabin unit 10 and the loading unit 20, the direction of power supply to the coil 116 is changed so that the magnetic body 117 may rotate in the opposite direction while the magnetic circuit is not formed between the magnetic body 117 and the liner magnet 115. Accordingly, while the magnetic body 117 rotates in the opposite direction, the first pulley 133 connected to the magnetic body 117 and the locking portion 123 connected to the second pulley 135 also rotates in the opposite direction, and thus the coupling state between the cabin unit 10 and the loading unit 20 is released.

On the other hand, the mechanical and magnetic connection between the cabin unit 10 and the loading unit 20 may be controlled by a controller.

The controller may be configured for controlling the coil 116, the assembly module, and the magnetic module to connect or disconnect the cabin unit 10 and the loading unit 20. For example, when connecting the cabin unit 10 and the loading unit 20, the controller may magnetically fix the cabin unit 10 and the loading unit 20 together by changing the magnetic circuit through the rotation force of the magnetic body 117 while the cabin unit 10 and the loading unit 20 are mechanically fixed together. Likewise, when disconnecting the cabin unit 10 and the loading unit 20, the controller may mechanically unfix the cabin unit 10 and the loading unit 20 while the cabin unit 10 and the loading unit 20 are magnetically unfixed by changing the magnetic circuit through the rotation force of the magnetic body 117. The controller may selectively fix or unfix the vehicle's cabin unit 10 and loading unit 20 in the present manner.

When unfixing the vehicle's cabin unit 10 and the loading unit 20, the controller is configured to control the coil 116 to rotate the magnetic body 117 in a direction opposite to the direction in which the electromagnetic force of the coil 116 is generated when the cabin unit 10 and the loading unit 20 are connected so that the cabin unit 10 and the loading unit 20 may be unfixed. As a result, the coupling and decoupling of the cabin unit 10 and the loading unit 20 are facilitated.

According to the exemplary embodiments of the present disclosure described thus far, the coupling force between the vehicle's cabin unit and loading unit may be enhanced by mechanical and magnetic connection.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method disclosed in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the invention to the precise forms disclosed, and obviously many modifications and variations are possible in light of the above teachings. The exemplary embodiments were chosen and described to explain predetermined principles of the invention and their practical application, to enable others skilled in the art to make and utilize various exemplary embodiments of the present disclosure, as well as various alternatives and modifications thereof. It is intended that the scope of the invention be defined by the Claims appended hereto and their equivalents.

What is claimed is:

1. A fixing apparatus selectively connecting a cabin unit and a loading unit used for loading a cargo at a rear of the cabin unit for a vehicle, the fixing apparatus comprising:

a coil generating an electromagnetic force;

an assembly module including a drive pulley and mechanically fixing the cabin unit and the loading unit together through a driving force of the drive pulley via the coil for coupling the loading unit with the cabin unit; and a magnetic module enclosing the assembly module on an external side of the assembly module and including a magnetic body rotatably mounted to the assembly module, wherein the magnetic module is configured for magnetically fixing the cabin unit and the loading unit together by changing a magnetic circuit through a rotation force of the magnetic body while the cabin unit and the loading unit are mechanically connected to each other.

2. The apparatus of claim 1, wherein the drive pulley includes a first pulley connected to the magnetic body to receive the rotation force directly and a second pulley connected to the first pulley through a pulley belt to receive the driving force from the first pulley.

3. The apparatus of claim 2, wherein the magnetic body of the magnetic module rotates through a magnetic flux of the coil, and the cabin unit and the loading unit are magnetically fixed through the rotation force of the magnetic body generated during rotation of the magnetic body.

4. The apparatus of claim 2, wherein the assembly module further includes:

a locking portion connected to the second pulley and rotating through the driving force received from the second pulley; and a coupling portion selectively coupled to the locking portion, wherein the locking portion is provided in the cabin unit and the coupling portion is provided in the loading unit.

5. The apparatus of claim 4, wherein the coupling portion includes a coupling groove recessed upward on a lower surface of the coupling portion.

6. The apparatus of claim 5, wherein the locking portion slides into the coupling groove as the loading unit moves downward and rotates through the driving force of the second pulley to be coupled to the coupling portion once the locking portion settles at a top portion of the coupling groove after sliding thereinto.

7. The apparatus of claim 6, wherein the locking portion is formed in a semicircular shape with a protrusion rotatable on one side of the locking portion.

8. The apparatus of claim 7, wherein the coupling groove is formed to be recessed along a sliding path of the locking portion and the top portion of the coupling groove is formed in a semicircular shape so that the locking portion settles at the top portion of the coupling groove, rotate, and is coupled to the coupling portion.

9. The apparatus of claim 1, wherein the assembly module further includes a connecting module on which the magnetic body is rotatably coupled and on which the coil surrounds.

10. The apparatus of claim 4, wherein the connecting module includes a first connecting module and a second connecting module with a predetermined distance therebetween, and wherein the magnetic body further include a magnet connecting a mid portion of the first connecting module and a mid portion of the second connecting module.

11. The apparatus of claim 1, further including a controller operatively connected to the coil is configured for controlling the coil to connect or disconnect the cabin unit and the loading unit.

12. The apparatus of claim 11, wherein, for connecting the cabin unit and the loading unit, the controller is configured to magnetically fix the cabin unit and the loading unit together by changing the magnetic circuit through rotation of the magnetic body while the cabin unit and the loading unit are mechanically fixed.

13. The apparatus of claim 11, wherein, for disconnecting the cabin unit and loading unit, the controller is configured to mechanically disconnect the cabin unit and the loading unit while the cabin unit and the loading unit are magnetically unfixed by changing the magnetic circuit through rotation of the magnetic body.

14. The apparatus of claim 11, wherein, the controller is configured to disconnect the cabin unit and the loading unit by controlling the coil to generate the electromagnetic force of the coil in a direction opposite to a direction in which the electromagnetic force of the coil is generated while the cabin unit and the loading units are connected to each other.

* * * * *